United States Patent
Hosoya

(10) Patent No.: US 6,529,205 B2
(45) Date of Patent: *Mar. 4, 2003

(54) IMAGE DATA DISPLAY APPARATUS IN WHICH IMAGE DATA ARE DISPLAYED ON TERMINAL DISPLAY UNIT AND NTSC SYSTEM DISPLAY UNIT

(75) Inventor: Kenichi Hosoya, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,852

(22) Filed: Dec. 21, 1998

(65) Prior Publication Data
US 2001/0040582 A1 Nov. 15, 2001

(30) Foreign Application Priority Data
Dec. 24, 1997 (JP) ............................................. 9-355455

(51) Int. Cl.⁷ ................................................. G09G 5/04
(52) U.S. Cl. .......................... 345/603; 345/1.1; 345/3.1; 345/30; 345/87; 345/213; 345/502; 345/603; 348/441; 348/443; 348/220; 348/449; 348/555
(58) Field of Search ............................ 345/154, 3, 132; 348/441, 552, 555

(56) References Cited

U.S. PATENT DOCUMENTS 5,276,436 A * 1/1994 Shaw et al. .................. 340/703
5,301,017 A * 4/1994 Murakami ................... 348/645
5,353,063 A * 10/1994 Yagisawa et al. ........... 348/426
5,519,825 A * 5/1996 Naughton et al. ........... 395/173
5,790,113 A * 8/1998 Perlman et al. ............. 345/213
6,008,795 A * 12/1999 Nakamura ................... 345/154
6,154,225 A * 11/2000 Kou et al. ................... 345/519

FOREIGN PATENT DOCUMENTS

JP          3-184086          8/1991

* cited by examiner

Primary Examiner—Bipin Shalwala
Assistant Examiner—Vincent E. Kovalick
(74) Attorney, Agent, or Firm—Sughrue Mion, PLLC

(57) ABSTRACT

An image data display apparatus includes a terminal display unit, an NTSC display unit, and a frame memory having a first port and a second port, for storing an image data. A display timing control unit generates a terminal display timing signal and an NTSC display timing signal. A frame memory control unit generates a first read control signal in response to the terminal display timing signal such that the image data is read out from the first port of the frame memory, and a second read control signal in response to the NTSC display timing signal such that at least a part of the image data is read out from the second port of the frame memory. A first converting unit converts the image data read out from the first port of the frame memory into a terminal display signal such that the read out image data is displayed on the terminal display unit. Also, a second converting unit converts the at least a part of the image data read out from the second port of the frame memory into an NTSC display signal such that the at least a part of the image data is displayed on the NTSC display unit.

22 Claims, 2 Drawing Sheets

IMAGE DATA DISPLAY APPARATUS IN WHICH IMAGE DATA ARE DISPLAYED ON TERMINAL DISPLAY UNIT AND NTSC SYSTEM DISPLAY UNIT

BACKGROUND OF THE INVENTION

1. Field of the Invention

The present invention relates to an image display apparatus which displays an image data stored in a frame memory of a computer apparatus. More particularly, the present invention relates to an image display apparatus which a signal with a RGB format stored in an information processing apparatus is converted and displayed into an NTSC signal.

2. Description of the Related Art

Conventionally, an image data in the form of bit map is stored in a frame memory which is composed of a dual port memory and a display control is performed to the image data. When such an image data in the form of bit map is converted into an NTSC signal to display on an NTSC display unit such as a home television unit, an exclusive use memory is needed for the NTSC display. However, there is a problem in the cost and the improvement is wanted.

FIG. 1 is a block diagram illustrating the structure of a conventional example.

A drawing processor 11 is connected with a frame memory 12 and a frame memory control unit 13. A display timing control unit 14 gives a timing signal to the frame memory control unit 13 such that a display data is read out from the frame memory 12. The read out display data is supplied to a digital-to-analog (D/A) converter 15. The digital-to-analog converter 15 converts the display data in a digital form into the display data in an analog form, to output as an RGB signal to a CRT (cathode-ray tube) display unit 16 in response to a timing signal supplied from the display timing control unit.

Also, the display data read out from the frame memory 12 is supplied to an NTSC frame memory 19. The display data is outputted from the NTSC frame memory 19 in response to a timing signal supplied from the display timing control unit 14, and is supplied to an NTSC converting unit 17. The NTSC converting unit 17 converting the display data into an NTSC signal such that the NTSC signal is displayed on an NTSC display unit 18.

As described above, when an image data stored in the frame memory composed of a dual port memory should be displayed on the NTSC display unit, an exclusive use frame memory is needed for the NTSC display.

Also, the region of the image data which can be displayed on the NTSC display unit is limited. Therefore, when an image data should be displayed on both the CRT display unit and the NTSC display unit, the image display apparatus has become expensive.

In addition, an image signal converting apparatus is described in Japanese Laid Open Patent Application (JP-A-Heisei 3-184086). In this reference, an RGB signal in the form of interlace is displayed on a computer display unit after it stored in an image memory. The RGB signal read out from the image memory is stored in one of field memories. Then, the RGB signal is read out and stored in a line memory. As a result, an output signal from the line memory is subjected to D/A conversion and encoded into an NTSC display signal.

SUMMARY OF THE INVENTION

The present invention is accomplished to solve the above problems. Therefore, an object of the present invention is to provide an image display apparatus in which when a dual port memory is used as a frame memory, an exclusive use frame memory is not needed for NTSC display.

Another object of the present invention is to provide an image display apparatus in which the whole of an image data stored in a frame memory can be displayed on a CRT display unit and a part of the image data for a rectangular region can be displayed on an NTSC display unit.

In order to achieve an aspect of the present invention, an image data display apparatus includes a terminal display unit, an NTSC display unit, and a frame memory having a first port and a second port, for storing an image data. A display timing control unit generates a terminal display timing signal and an NTSC display timing signal. A frame memory control unit generates a first read control signal in response to the terminal display timing signal such that the image data is read out from the first port of the frame memory, and a second read control signal in response to the NTSC display timing signal such that at least a part of the image data is read out from the second port of the frame memory. A first converting unit converts the image data read out from the first port of the frame memory into a terminal display signal such that the read out image data is displayed on the terminal display unit. Also, a second converting unit converts the at least a part of the image data read out from the second port of the frame memory into an NTSC display signal such that the at least a part of the image data is displayed on the NTSC display unit.

The frame memory desirably has a serial port as the first port and a random port as the second port. Also, the second converting unit desirably includes a buffer for storing the at least a part of the image data.

In the above, the at least a part of the image data is in a specified rectangular region. The image data display apparatus may further include a designating unit for specifying the specified rectangular region. Thus, the frame memory control unit generates the second read control signal in response to the NTSC display timing signal based on the specified rectangular region.

The image data display apparatus may further includes a processing unit for performing predetermined processing to the at least a part of the image data to transfer to the second converting unit.

In order to achieve another aspect of the present invention, a method of displaying an image data, includes the steps of:

generating a terminal display timing signal and an NTSC display timing signal;

generating a first read control signal in response to the terminal display timing signal to read out an image data from a first port of a frame memory;

generating a second read control signal in response to the NTSC display timing signal to read out at least a part of the image data from a second port of the frame memory;

performing first conversion of the read out image data into a terminal display signal such that the read out image data is displayed on a terminal display unit; and performing second conversion of the at least a part of the image data read out into an NTSC display signal such that the at least a part of the image data is displayed on an NTSC display unit.

In order to still another aspect of the present invention, an image data display apparatus includes a frame memory, a terminal display unit, and an NTSC display unit, a generating section for generating a terminal display timing signal and an NTSC display timing signal, a first control signal generating section for generating a first read control signal in response to the terminal display timing signal to read out an image data from a first port of the frame memory, a second control signal generating section for generating a second read control signal in response to the NTSC display timing signal to read out at least a part of the image data from a second port of the frame memory, a first converting section for performing first conversion of the read out image data into a terminal display signal such that the read out image data is displayed on the terminal display unit, and a second converting section for performing second conversion of the at least a part of the image data read out into the NTSC display signal such that the at least a part of the image data is displayed on an NTSC display unit.

DESCRIPTION OF THE PREFERRED EMBODIMENTS

Next, an image display apparatus of the present invention will be described below in detail with reference to the attached drawings.

Figure 1:
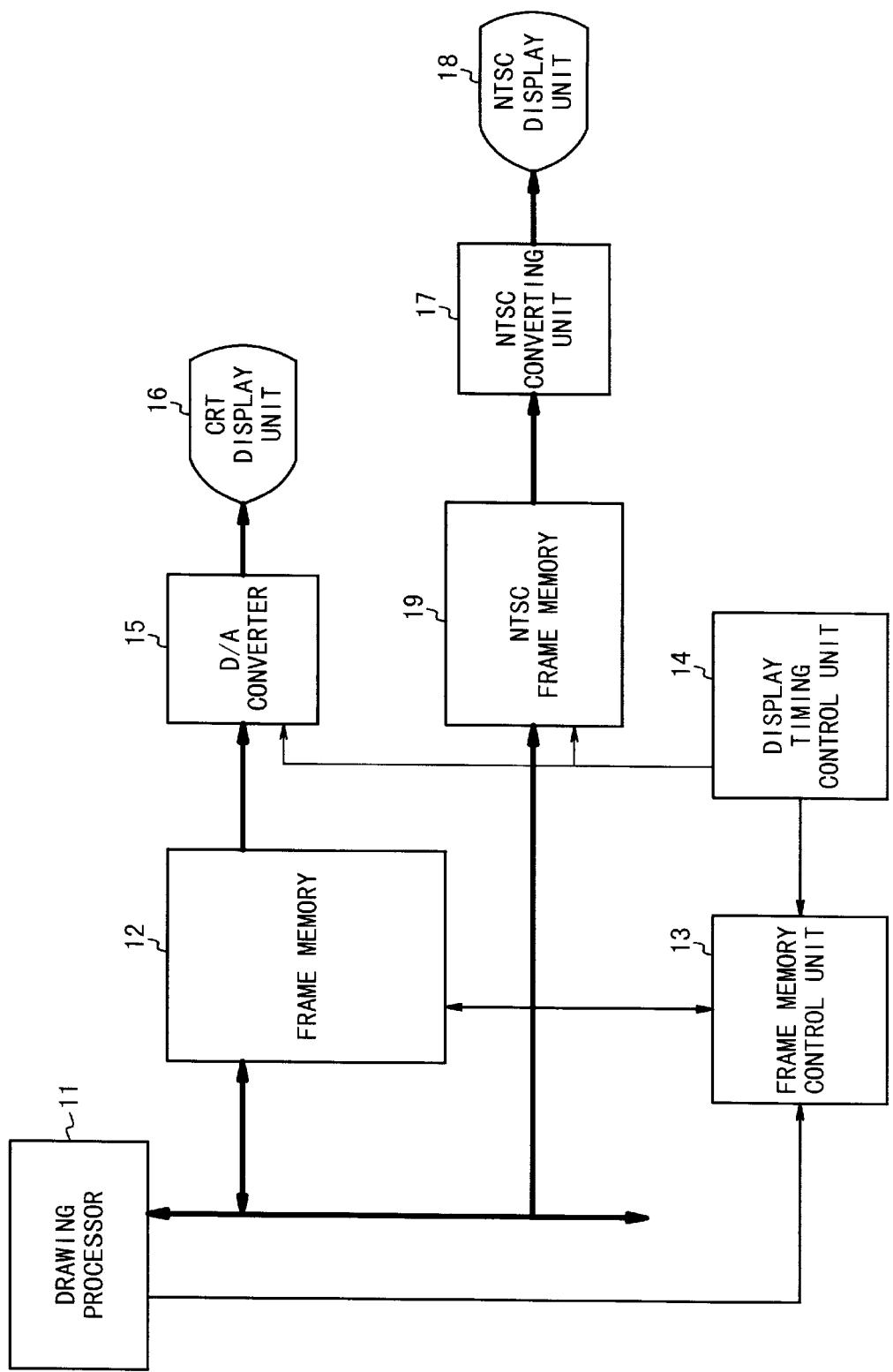
FIG. 1 is a block diagram illustrating the structure of a conventional example of an image display apparatus.
Figure 2:
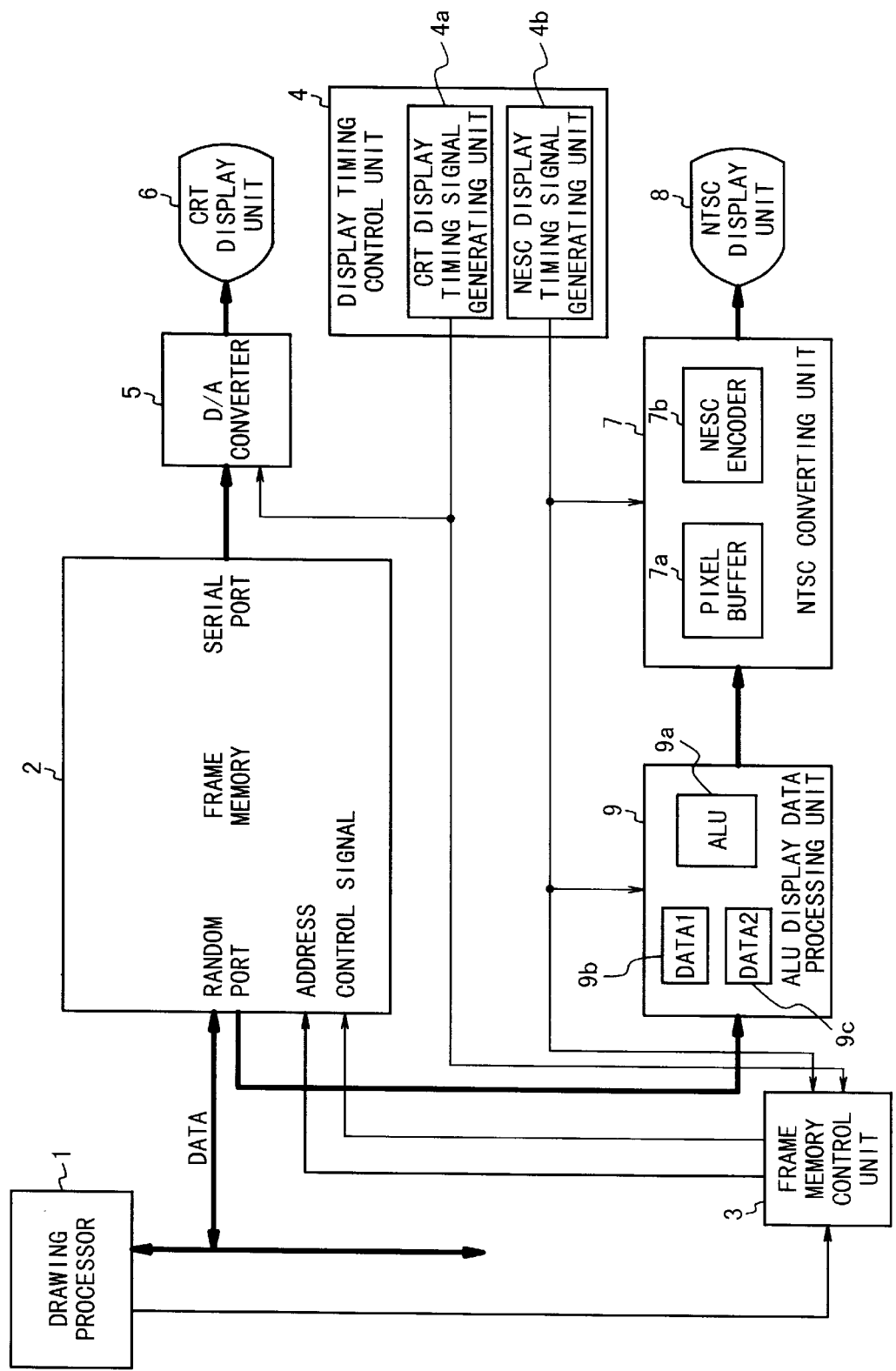
FIG. 2 is a block diagram illustrating the structure of an image display apparatus according to an embodiment of the present invention.

Referring to FIG. 2, the image display apparatus according to an embodiment of the present invention is composed of a drawing processor 1, a frame memory, a frame memory control unit 3, a display timing control unit 4, a digital-to-analog (D/A) converter 5, a CRT display unit 6 as a terminal display unit, an NTSC converting unit 7, an NTSC display unit 8 and an ALU display data processing unit 9. The display timing control unit 4 is composed of a CRT display timing signal generating unit 4a and an NTSC display timing signal generating unit 4b. The NTSC converting unit 7 is composed of a pixel buffers 7a and an NTSC encoder 7b. The ALU display data processing unit 9 is composed of an ALU (arithmetic logic processing unit) 9-1 and data storage sections 9b and 9c.

Next, an operation of the image display apparatus will be described below.

First, the drawing processor 1 outputs a region specifying data to the frame memory control unit 3. The frame memory control unit 3 stores the region specifying data. In this embodiment, two regions are specified based on the region specifying data. This region may be the whole or a part of image data stored in the frame memory 2.

Also, the drawing processor 1 generates addresses to supply to the frame memory control unit 3. The frame memory control unit 3 generates and supplies a frame memory control signal and an address signal to the frame memory 2 based on the address generated by the drawing processor 1. Also, an image data outputted from the drawing processor 1 is directly supplied to the frame memory 2. Thus, the image data is stored in the frame memory 2.

Then, the CRT display timing signal generating unit of the display timing control unit 4 generates a CRT display timing signal to supply to the frame memory control unit 3. The frame memory control unit 3 generates an address signal and a control signal to the frame memory 2 in response to the CRT display timing signal such that a display data is outputted from the serial port of the frame memory 2. The display data outputted from the serial port of the frame memory 2 is supplied to the D/A converter 5. The D/A converter 5 converts the digital display data into an analog image signal to output to the CRT display 6. Thus, the image data from the frame memory is displayed on the CRT display unit 6.

Also, an NTSC display timing signal is generated from the NTSC display timing signal generating unit 4b of the display timing control unit 4 and supplied to the frame memory control unit 3. The frame memory control unit 3 generates an address signal and a control signal in response to the NTSC display timing signal to supply to the frame memory. As a result, two display data DATA1 and DATA2 in the two rectangular regions specified by the drawing processor 1 are read out from the random port of the frame memory 2. The display data read out from the random port of the frame memory 2 are supplied to the ALU display data processing unit 9 and stored in the storage sections 9b and 9c.

The ALU display data processing unit 9 performs various types of processing such as an average operation and a logical AND operation to the display data. In this example, a synthetic image data is produced from the display data DATA1 and DATA2 by the ALU 9a of the ALU display data processing unit 9. The synthetic image data is supplied to the NTSC converting unit 7 and temporarily held in the pixel buffer 7a of the NTSC converting unit 7. Then, the synthetic image data is sequentially supplied to the NTSC encoder 7b such that the image data is converted into an NTSC signal. The NTSC signal is supplied to the NTSC display unit 8. Thus, the synthetic image data in the optionally specified rectangular area of the image data stored in the frame memory 2 is can be displayed on the NTSC display unit 8.

As described above, according to the image display apparatus of the present invention, the image data stored in the frame memory can be displayed on both of the CRT display unit and a NTSC system display unit. In this case, the image data to be displayed on the NTSC display unit can be read out from the random port of the frame memory. Therefore, any exclusive use frame memory for the NTSC display unit is not necessary so that the product cost can be decreased.

What is claimed is:

1. An image data display apparatus comprising:
   a terminal display unit;
   an NTSC display unit;
   a frame memory having a first port and a second port, for storing an image data;
   a display timing control unit for generating a terminal display timing signal and an NTSC display timing signal;
   a frame memory control unit for determining from which port of said frame memory said image data will be read before said image data is read out of said frame memory, such that:
      when a first read control signal is generated in response to the terminal display timing signal said image data is read out from said first port of said frame memory, and
      when a second read control signal is generated in response to the NTSC display timing signal at least a part of said image data is read out from said second port of said frame memory;
   a first converting unit for converting said image data read out from said first port of said frame memory into a terminal display signal such that the image data read out of said first port is displayed on said terminal display unit; and a second converting unit for converting said at least a part of said image data read out from said second port of said frame memory into an NTSC display signal such that said at least a part of said image data read out of said second port is displayed on said NTSC display unit.

2. An image data display apparatus according to claim 1, wherein said frame memory has a serial port as said first port and a random port as said second port.

3. An image data display apparatus according to claim 1, wherein said second converting unit includes a buffer for storing said at least a part of said image data.

4. An image data display apparatus according to claim 1, wherein said at least a part of said image data is in a specified rectangular region.

5. An image data display apparatus according to claim 4, further comprising a designating unit for specifying said specified rectangular region.

6. An image data display apparatus according to claim 1, further comprising a processing unit for performing predetermined processing to said at least a part of said image data to transfer to said second converting unit.

7. The image data display apparatus according to claim 1, further including means for causing the simultaneous display of said terminal display signal on said terminal display unit and said NTSC display signal on said NTSC display unit.

8. A method of displaying an image data comprising the steps of:

generating a terminal display timing signal and an NTSC display timing signal for determining from which port of a frame memory an image data will be read before said image data is read out of said frame memory;

generating a first read control signal in response to the terminal display timing signal, said first read control signal indicating that said image data is read from a first port of said frame memory;

generating a second read control signal in response to the NTSC display timing signal, said second read control signal for indicating that at least a part of said image data is read from a second port of said frame memory;

performing a first conversion of said image data, read from said first port, into a terminal display signal such that the image data read from said first port is displayed on a terminal display unit; and performing a second conversion of said at least a part of said image data, read from said second port, into an NTSC display signal such that said at least a part of said image data read from said second port is displayed on an NTSC display unit.

9. A method according to claim 8, wherein said step of performing second conversion includes storing said at least a part of said image data in a buffer.

10. A method according to claim 8, wherein said step of generating a second read control signal includes generating said second read control signal such that said at least a part of said image data in a specified rectangular region is read out.

11. A method according to claim 10, wherein said step of generating a second read control signal further includes specifying said specified rectangular region.

12. A method according to claim 8, further comprising the step of performing predetermined processing to said at least a part of said image data to transfer to said second converting unit.

13. The method of displaying an image data according to claim 8, further including the step of simultaneously displaying said terminal display signal on said terminal display unit and said NTSC display signal on said NTSC display unit.

14. An image data display apparatus comprising:

a frame memory;

a terminal display unit;

an NTSC display unit generating means for determining from which port of said frame memory an image data will be read before said image data is read out of said frame memory by generating a terminal display timing signal and an NTSC display timing signal;

first control signal generating means for generating a first read control signal in response to the terminal display timing signal to read out said image data from a first port of said frame memory;

second control signal generating means for generating a second read control signal in response to the NTSC display timing signal to read out at least a part of said image data from a second port of said frame memory;

first converting means for performing a first conversion of said image data, read from said first port, into a terminal display signal such that the image data read from said first port is displayed on said terminal display unit; and second converting means for performing a second conversion of said at least a part of said image data, read from said second port, into said NTSC display signal such that at least a part of said image data read from said second port is displayed on an NTSC display unit.

15. An image data display apparatus according to claim 14, wherein said second converting means has a buffer and stores said at least a part of said image data in said buffer.

16. An image data display apparatus according to claim 14, wherein said second converting means generates said second read control signal such that said at least a part of said image data in a specified rectangular region is read out.

17. An image data display apparatus according to claim 16, wherein said second converting means further includes means for specifying said specified rectangular region.

18. An image data display apparatus according to claim 14, further comprising means for performing predetermined processing to said at least a part of said image data to transfer to said second converting unit.

19. The image data display apparatus according to claim 14, further including means for causing the simultaneous display of said terminal display signal on said terminal display unit and said NTSC display signal on said NTSC display unit.

20. An image data display apparatus comprising:

a terminal display unit;

an NTSC display unit;

a frame memory having a first port and a second port, for storing an image data wherein at least a part of said image data is in a specified rectangular region and a designating unit is used for specifying said specified rectangular region;

a display timing control unit for generating a terminal display timing signal and an NTSC signal;

a frame memory control unit for generating a first read control signal in response to the terminal display timing signal such that said image data is read out from said first port of said frame memory, and a second read control signal in response to the NTSC display timing signal such that at least a part of said image data is read out from said second port of said frame memory wherein said second read control signal is also based on said specified rectangular region;

a first converting unit for converting said image data read out from said first port of said frame memory into a terminal display signal such that the read out image data is displayed on said terminal display unit; and a second converting unit for converting said at least part of said image data read out from said second port of said frame memory into an NTSC display signal such that said at least a part of said image data is displayed on said NTSC display unit.

21. A method of displaying an image data, comprising the steps of:

generating a terminal display timing signal and an NTSC display signal;

generating a first read control signal in response to the terminal display timing signal to read out an image data from a first port of a frame memory;

generating a second read control timing signal in response to the NTSC display timing signal to read out at least a part of said image data from a second port of said frame memory such that said second read control signal is based on a specified rectangular region in said frame memory;

performing a first conversion of said read out image data into a terminal display signal such that the read out image data is displayed on a terminal display unit; and performing a second conversion of said image data read out into an NTSC display signal such that said at least a part of said image data is displayed on an NTSC display unit.

22. An image data display apparatus comprising a frame memory;

a terminal display unit;

an NTSC display unit;

generating means for generating a terminal display timing signal and an NTSC display timing signal;

first control signal generating means for generating a first read control signal in response to the terminal display timing signal to read out an image data from a first port of said frame memory;

second control signal generating means for generating a second control signal in response to the NTSC display timing signal to read out at least a part of said image data from a second port of said frame memory and to reading out at least a part of said image data in a specified rectangular region wherein a specifying means specifies the rectangular region containing said image data to be read out;

first converting means for performing first conversion of said read out image data into a terminal display signal such that the read out image data is displayed on said terminal display unit; and second converting means for performing a second conversion of said at least a part of said image data read out, based on said specified rectangular region, into said NTSC display signal, such that at least a part of said image data is displayed on an NTSC display unit.

\* \* \* \* \*